T. G. Packer.
Broom Head.

Nº 67,573.      Patented Aug. 6, 1867.

Witnesses:
Theo. Fuseli
J. A. Service

Inventor:
T. G. Packer
Per Munn & Co.
Attorneys

United States Patent Office.

T. G. PACKER, OF MEXICO, NEW YORK.

Letters Patent No. 67,573, dated August 6, 1867.

---

IMPROVED BROOM-HEAD.

---

The Schedule referred to in these Letters Patent and making part of the same.

---

TO ALL WHOM IT MAY CONCERN:

Be it known that I, T. G. PACKER, of Mexico, in the county of Oswego, and State of New York, have invented a new and improved Broom-Head; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved broom-head, simple in construction, easily filled, and which will hold the corn securely and firmly in place; and it consists in the combination of the concavo-convex crescent-shaped cap, arms, binding-bands or loops, hooks, screw, binding-bar and nut with each other, as hereinafter more fully described.

Figure 1:
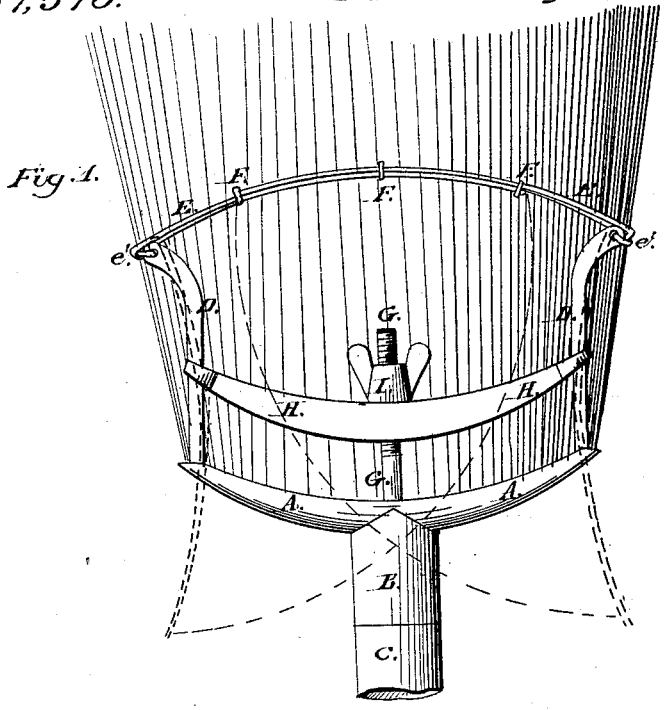
Figure 1 is a side view of my improved broom-head.
Figure 2:
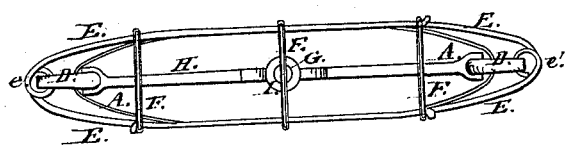
Figure 2 is a bottom view of the same, the brush or corn being removed.

A is the crescent-shaped cap, the outer side of which is convex, and the inner side concave, as shown in the drawings. To the centre of the outer side is formed or rigidly attached a socket, B, for the reception of the handle C. To the ends of the cap A, upon its inner or concave side, are rigidly attached the arms D, the upper ends of which are bent outward, as shown in fig. 1, and have holes formed through them for the reception of the wire loops or bands E. The loops or bands E have small loops $e'$ formed upon their middle parts, by which they are pivoted to the ends of the arms D, and are of such a length that their ends may extend about three-quarters across the sides of the broom-head, as shown in fig. 1, where they are secured in place by hooks F passing through the brush of the broom-head, and hooking upon the said wire loops or bands. The ends of the arms of the loops or bands E are slightly bent or turned outward to prevent the said ends of the loops E from slipping out of the hooks F. To the centre of the inner or concave side of the crescent-shaped cap A is rigidly and securely attached a screw, G. H is a binding-bar corresponding in shape to the shape of the cap A, and the ends of which are forked or notched to fit and slide upon the arms D. Through the centre of the bar H is formed a hole through which passes the screw G, said hole being of such a size that the bar H may move freely up and down upon the said screw, being held in proper position to clamp the corn by the thumb-nut I. In filling the broom-head the butts of the broom-corn are laid across the concave side of the cap A in alternate layers, with their brush projecting upon either side. The binding-bar H is then forced down upon it, forcing it into the concavity of the cap A, and clamping it securely in place. The bands or loops E, which have been hanging down in the position shown in red in fig. 1, are then brought up, sweeping the corn evenly and smoothly into the proper position to form the broom, and are secured in place by the hooks F.

I claim as new, and desire to secure by Letters Patent—

The combination of the concavo-convex crescent-shaped cap A, arms D, binding-loops or bands E, hooks F, screw G, binding-bar H, and thumb-nut I with each other, substantially in the manner herein shown and described and for the purpose set forth.

T. G. PACKER.

Witnesses:
LEWIS MILLER,
JER'H B. TAYLOR.